W. T. & J. B. BURTON.
Device for Hitching Horses.

No. 197,014.  Patented Nov. 13, 1877.

UNITED STATES PATENT OFFICE.

WILLIAM T. BURTON AND JOHN B. BURTON, OF BOSTON, MASSACHUSETTS.

IMPROVEMENT IN DEVICES FOR HITCHING HORSES.

Specification forming part of Letters Patent No. 197,014, dated November 13, 1877; application filed August 28, 1877.

*To all whom it may concern:*

Be it known that we, WILLIAM T. BURTON and JOHN B. BURTON, both of Boston, in the county of Suffolk and State of Massachusetts, have invented a new and Improved Device for Hitching Horses, which improvement is fully set forth and described in the following specification and accompanying drawing.

This improvement relates to that class of horse-hitchers in which the animal is not hitched to any hitching-post or other object foreign to the harness or team, but is prevented from starting and running away by means of arrangements of straps, &c., which are attached to some portion of the horse, harness, or team, checking the horse without outside aid.

The difficulty with such devices, especially when they have been attached to the horse's legs, is that when the horse is suddenly frightened or starts suddenly for any reason, when hitched, he is liable to be instantly thrown down by the hitching device, which usually extends from the leg to the wheel or other portion of the team. This is dangerous to the horse, and stands in the way of the adoption of self-hitching devices.

By means of our invention this difficulty is entirely obviated, as the horse is allowed a certain amount of freedom. The effect upon him, if he starts, is exactly similar to the effect of having a person holding his bit. While the animal is securely held and prevented from running away, he is not liable to be thrown down.

Figure 1:
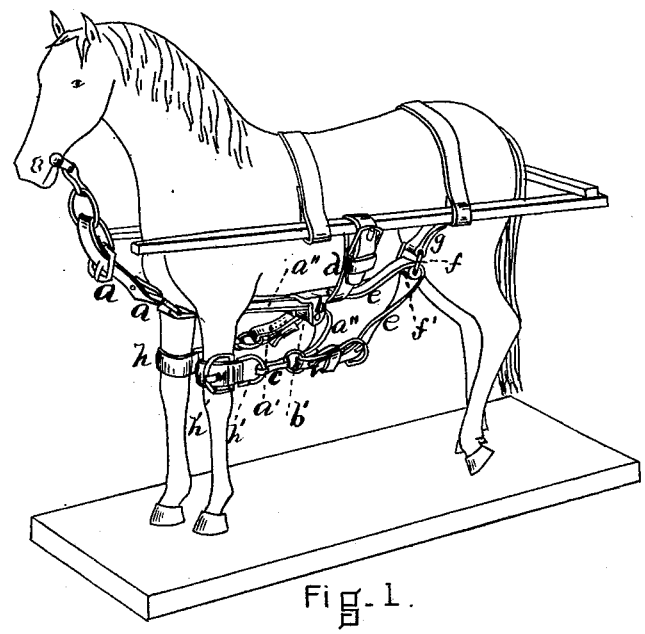
Figure 2:
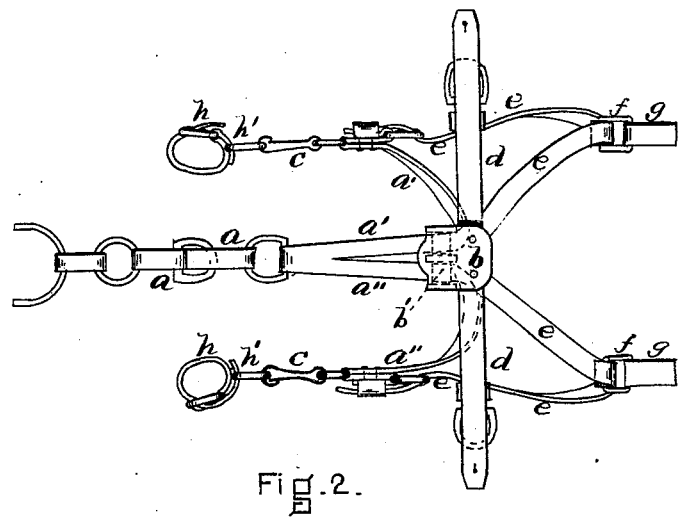

In the accompanying drawings, Figure 1 is a view, in perspective, of a horse provided with our device. The straps, &c., are necessarily much too large and out of proportion, but the principle is illustrated. Fig. 2 is a plan view of the same removed from the horse.

Similar letters of reference indicate corresponding parts.

*a* represents the martingale passing downward from the bit, and connecting with the two straps *a' a''*, (forming a part of the martingale.) These diverging straps *a' a''* pass over rollers *b'*, which are placed in the metallic frame or plate *b* under the horse's belly, and thence pass forward and connect with the hooks *c c*.

*d d* are the straps taking the place of the ordinary shaft-girth, one end of each being attached to the plate *b*, and the other end being buckled over the shaft.

*e e* are straps attached to the plate *b*, and extending back and passing over rollers *f'*, set in frames *f*, which are held by the straps *g*, fastened to the shafts back of the breeching-hooks. (Not shown in the drawing.) After passing over the rollers *f'*, the straps *e e* pass forward and attach to the straps *a' a''*, which are fastened to the hooks *c c*.

*h h* are bands placed around the fore legs above the knee, and provided with rings or similar devices *h' h'*, into which the hooks *c c* fasten when the horse is hitched.

In the drawing the horse is represented as being hitched. Should he attempt to start, the movement of his fore legs would pull upon the straps *a' a''*, which are a part of the martingale, and draw down his head by the bit, while the straps *e e* would prevent the plate *b* from being drawn forward. As every motion of the horse's fore legs would draw upon the bit, he could move very slowly, but could not run away, and, at the same time, he would not be violently thrown down nor tripped, which is the effect produced by other attachments to the legs of horses, but he would be held in the manner best understood by the horse—viz., by the bit.

The device could be connected with the hind legs, if desired.

When the horse is being driven the hooks *c c* are detached from the rings *h' h'*, and hung from any convenient portion of the harness, the shaft-girth *d*, perhaps, being the most practicable.

When the horse is to be left, one or both of the hooks *c c* may be snapped into the position shown in the drawing, and the horse is securely hitched.

Having thus fully described our invention, what we claim, and desire to secure by Letters Patent, is—

The device for hitching horses herein described, consisting of the martingale *a*, diverging into the straps *a' a''*, the plate *b*, rollers *b'*, straps *e*, rollers *f'*, straps *g*, shaft-girth *d*, leg-bands *h*, and hooks *c*, all constructed, combined, and arranged substantially as and for the purpose herein set forth.

WILLIAM T. BURTON.
JOHN B. BURTON.

Witnesses:
HENRY W. WILLIAMS,
B. W. WILLIAMS.